United States Patent [19]
Schmitz et al.

[11] Patent Number: 5,355,842
[45] Date of Patent: Oct. 18, 1994

[54] GAS HOT WATER HEATER

[75] Inventors: Heribert Schmitz, Braunfels; Dietmar Debus, Rauschenberg, both of Fed. Rep. of Germany

[73] Assignee: Viessmann Werke GmbH & Co., Allendorf, Fed. Rep. of Germany

[21] Appl. No.: 184,466

[22] Filed: Jan. 21, 1994

[30] Foreign Application Priority Data

Jan. 23, 1993 [DE] Fed. Rep. of Germany ....... 4301804

[51] Int. Cl.$^5$ .............................................. F22B 5/00
[52] U.S. Cl. .................................. 122/17; 122/13.1; 122/14; 122/19; 126/361
[58] Field of Search ........................ 122/17, 14, 19, 16, 122/13.1, 18; 126/350 R, 361

[56] References Cited

U.S. PATENT DOCUMENTS 4,510,890  4/1985  Cowan ................................... 122/17
5,247,908  9/1993  Williamson ..................... 122/13.1 X Primary Examiner—Edward G. Favors
Attorney, Agent, or Firm—Webb Ziesenheim Bruening Logsdon Orkin & Hanson

[57] ABSTRACT

The invention is concerned with a gas hot water heater intended for installation in a wall and including a combustion chamber from which are guided heating gas tubings within a water-carrying housing. The housing is provided with connections for forward and rearward flow of water and an exhaust gas collecting chamber provided with connections for exhaust gas and condensate discharge. In the practice of the invention, a heating gas tubing passing from top to bottom through the water-carrying flat box-type housing is in the form of at least one pocket extending parallel to a broad rear wall of the housing. A water-cooled combustion chamber, disposed in an upper portion of the housing substantially corresponds, in plan view, to a flat rectangular cross-section of the housing. A burner insert opening of the combustion chamber is provided within or approximately within the plane of a front wall having a width corresponding to, and extending parallel with, a rear wall. This will result in an extremely flat design of the hot water heater involving low manufacturing efforts and permitting an automated manufacture.

14 Claims, 4 Drawing Sheets

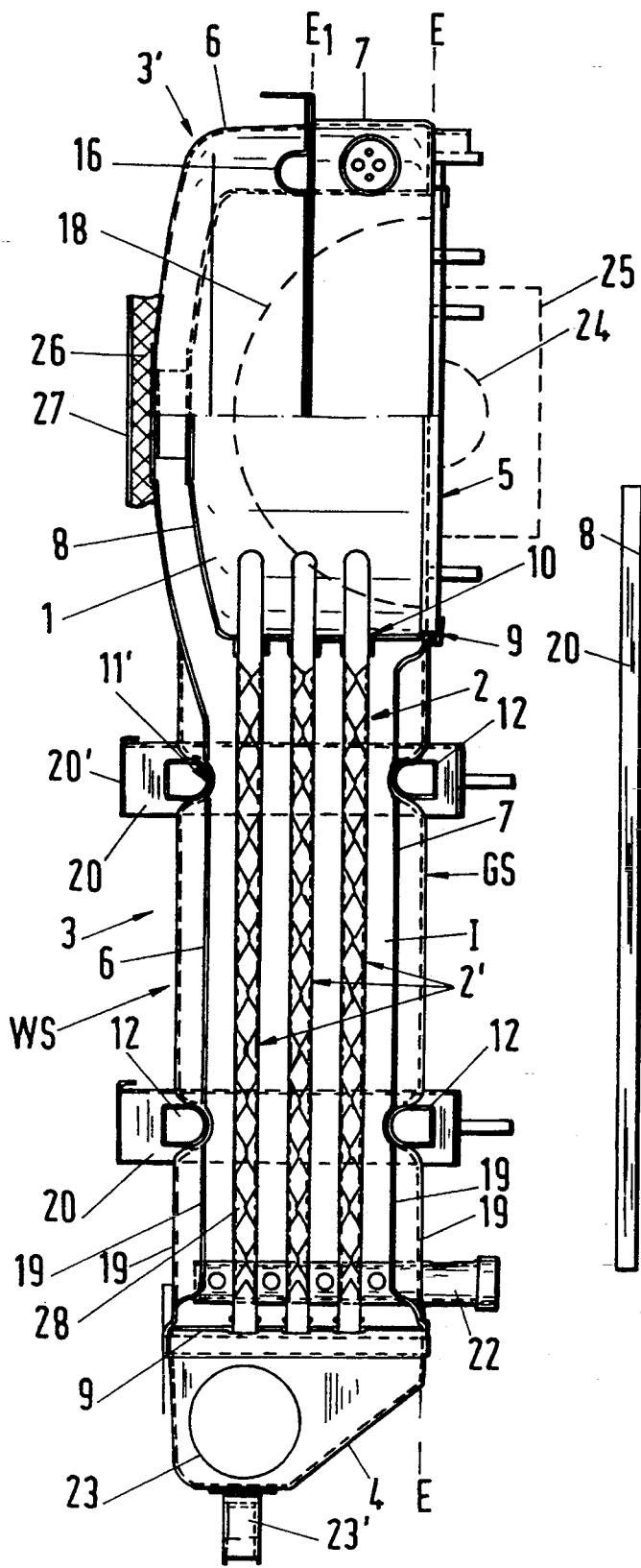
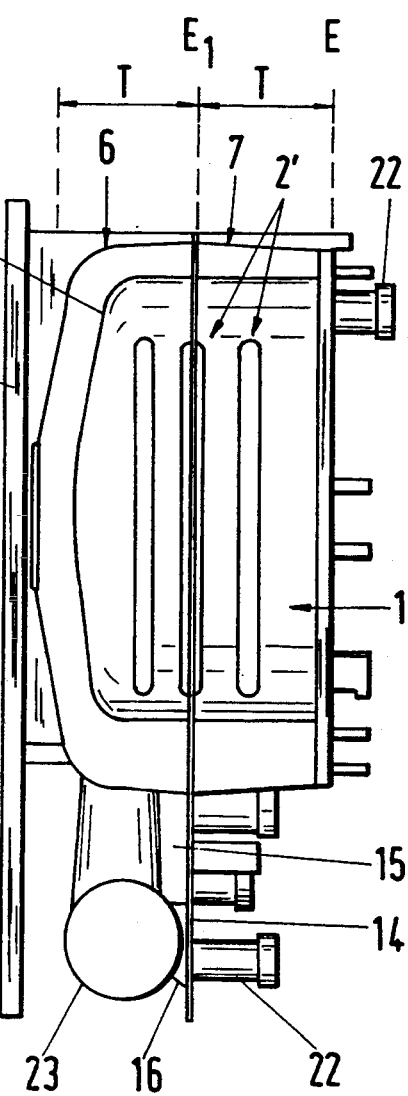

Fig. 5
Fig. 4
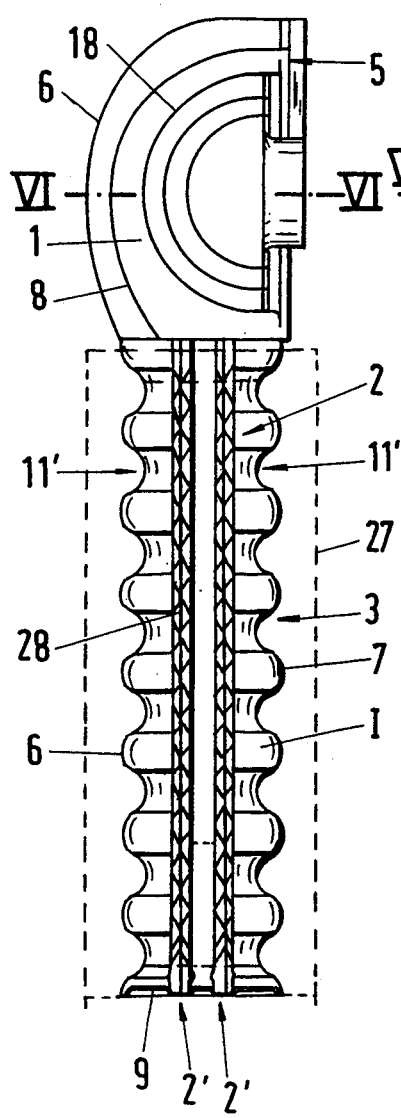
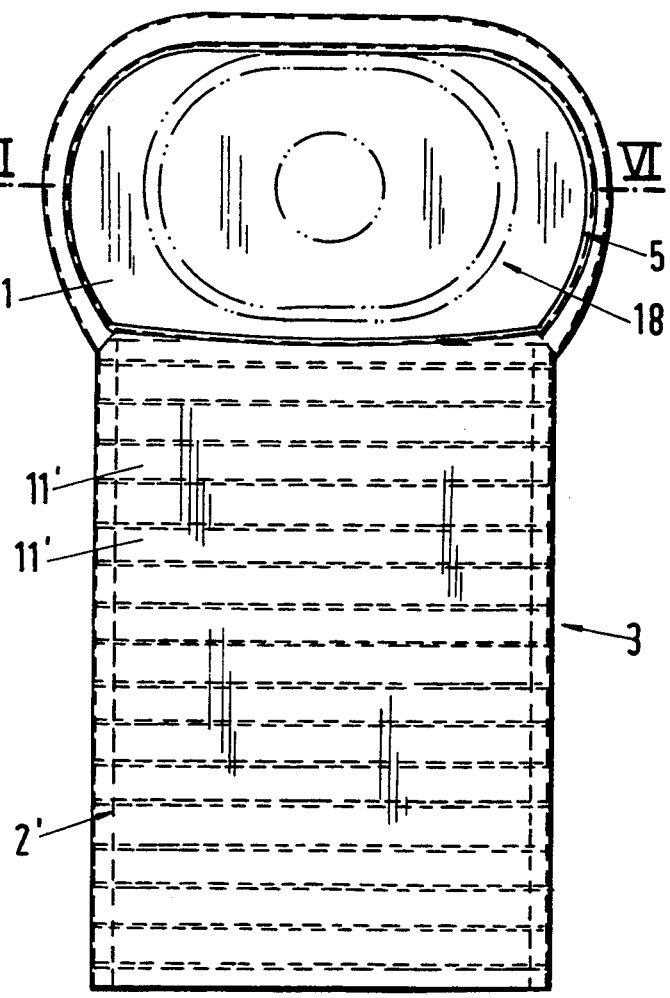
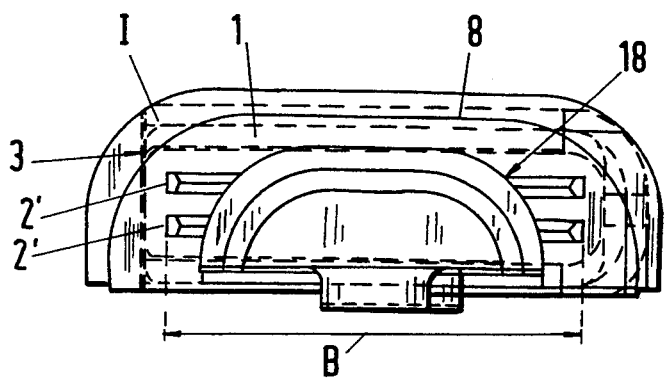
Fig. 6

GAS HOT WATER HEATER

BACKGROUND OF THE INVENTION

1. Field of the Invention

The invention is concerned with a gas hot water heater for installation in a wall.

2. Description of the Prior Art

Gas hot water heaters are known in the art, for example, from German utility model No. 89 03 020. In that water heater, which can also be operated as a water heater by condensation of the heating gases, the standard design principle of horizontally oriented water heaters has been adhered to, i.e. burner, combustion chamber, heating gas tubings and exhaust gas collecting chamber are arranged in series thus involving relatively large depth requirements. In addition, the manufacturing effort involved with such a water heater is substantial, which also applies to water heaters of the type disclosed by German utility models 86 01 896 and 89 03 023 which are neither intended nor suitable for wall installation in view of their angular housings.

SUMMARY OF THE INVENTION

An object of the invention is to provide a gas hot water heater that requires low manufacturing efforts, permits an automated manufacture and which, as regards the dimensions thereof, is of an extremely flat design.

A water heater in accordance with the present invention includes a vertically arranged housing which, in a horizontal section, is of a flat-rectangular design, at least one heating gas tubing is in the form of a pocket and is arranged parallel to the broad walls of the housing extending parallel with respect to one another, and substantially corresponds to the width thereof. A cup-shaped combustion chamber is provided in an upper portion of the housing, with the combustion chamber, in plan view, substantially corresponding to the flat-rectangular cross-section of the housing below the combustion chamber. An opening of the combustion chamber for connection of a gas blower burner is arranged within or approximately within a plane in which a front wall of the housing extends.

The extremely flat and compact design of the present invention is achieved in that heating gas tubings are formed from pockets and extend parallel to the broad rear wall of the housing. The water-cooled combustion chamber, in plan view and in horizontal cross-section, does not require a cross-sectional surface area exceeding the flat-rectangular cross-sectional surface area of the housing in which the width of the side walls preferably corresponds to half the width of the two other surfaces. Considering the flat design, a burner inserted into a burner insert opening, due to the shape of the inner combustion chamber cup, is preferably a metal cloth surface burner of a semi-global or semi-ellipsoidal configuration or of a similar shape.

As the burner insert opening extends within or approximately within the plane of the front wall of the housing, it is only the burner blower or the feed-in line of the gas/air mixture that protrudes beyond the front wall face of the housing.

To permit easy and automated manufacture of the present invention, it is advantageous to use an embodiment in which the water-carrying housing, inclusive of the combustion chamber, is formed of the following components: a rear wall cup, a front wall cup and an internal pot-shaped combustion chamber cup which is inserted into an opening of the front wall cup and which is provided with connecting apertures for the pockets incorporated at the bottom end there of which extend into a bottom cup on which is mounted an exhaust gas collecting chamber.

Although the housing also could be designed such that a cup is formed by the rear wall and the two side walls and is sealed at the front by a substantially planar plate, the cups—to avoid the need of molding the cups excessively deeply—are interconnected in a liquid-tight manner along a vertical central plane of the housing, i.e. each of the cups having a depth corresponding to approximately half the depth of the housing.

Concerning the material of which the housing and the pockets are made, materials of different combination can be employed, such as steel/stainless steel; steel/aluminium; and stainless steel/aluminium, to name just a few examples.

The cups forming the rear and front walls of the housing, in the area of the pockets, are provided with reinforcing embossings, with wall supporting elements being provided in the horizontally extended reinforcing embossings. Moreover, the cups may be provided with lug extensions arranged in a central plane in liquid-tight abutting relationship and embossings having connecting apertures.

Conduit and housing cavities may also be located in the extensions, thereby enabling accessories such as pumps, safety valves or the like to be provided directly on the housing of the heater. Conduits or pieces of conduits otherwise required can therefore be eliminated.

Preferred embodiments of the invention will hereinafter be described in conjunction with the accompanying drawings.

BRIEF DESCRIPTION OF THE DRAWINGS

FIG. 2 shows a longitudinal section along lines II—II of FIG. 1;

FIG. 3 is a cross-sectional view along lines III—III of FIG. 1;

FIG. 4 is a front view of the hot water heater housing of a slightly modified embodiment of the present invention;

FIG. 5 shows a longitudinal section through the housing along lines V—V of FIG. 4;

FIG. 6 shows a cross-sectional view along lines VI—VI of FIGS. 4, 5;

DESCRIPTION OF THE PREFERRED EMBODIMENTS

Figure 1:
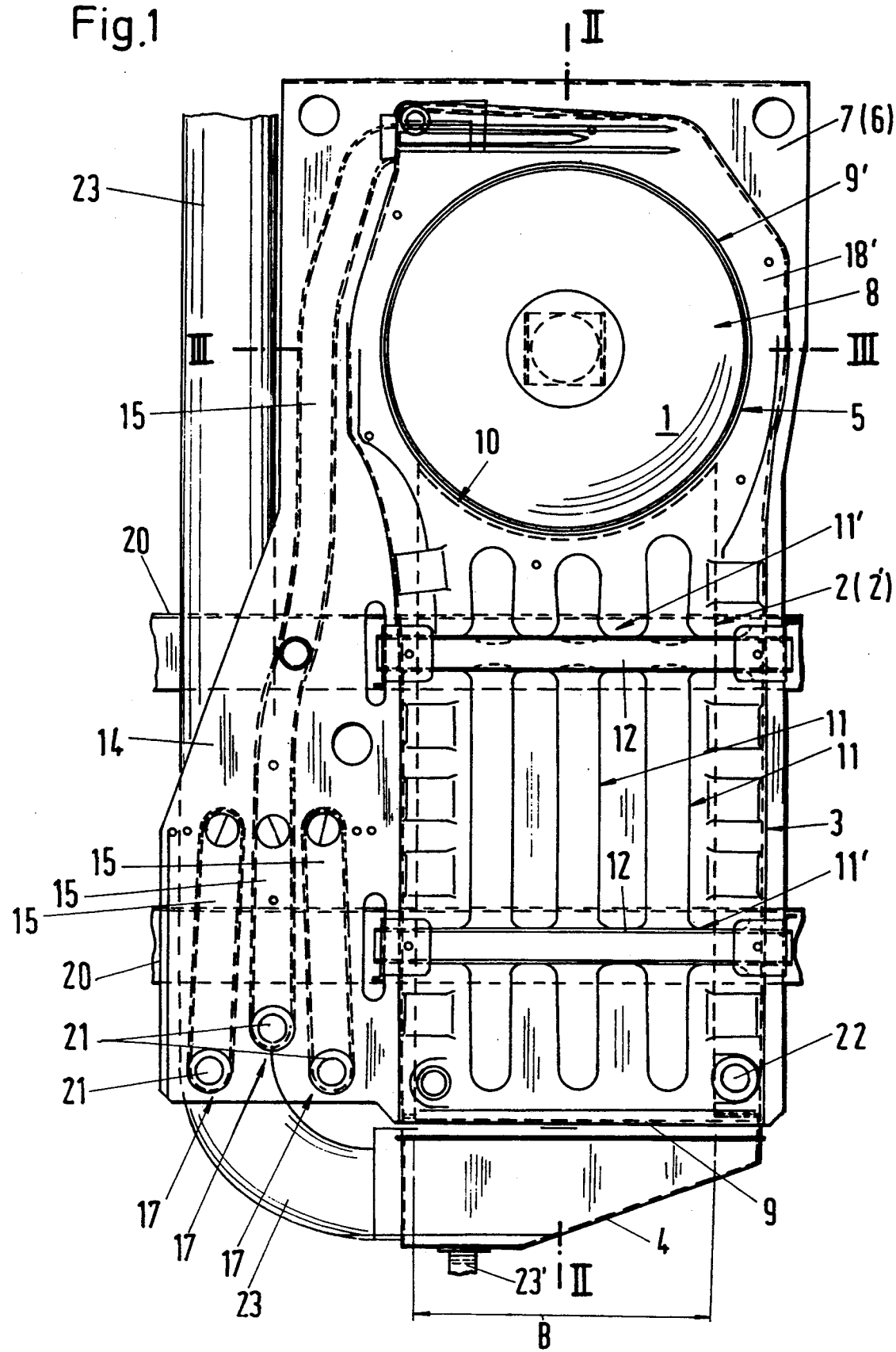
FIG. 1 is a front view of a gas hot water heater in accordance with the present invention.

The gas hot water heater of the present invention includes a combustion chamber 1 from which pockets 2' forming the heating gas tubing are guided, within a water-carrying housing 3 provided with connections 21, 22 for the forward and backward flow of water, to an exhaust gas collecting chamber 4 provided with connections 23, 23' for exhaust gas and condensate discharge. It is important for a water heater of this type—which applies to all of the embodiments as shown—that the heating gas tubings 2 passing from top to bottom through the water-carrying, flat box-type housing 3 be formed as pockets 2' extending parallel to the broad wall mounting surface WS (rear wall) of the housing 3, with three pockets 2' being provided in the embodiment shown in FIGS. 1 to 3 and two pockets 2' being provided in the embodiment shown in FIGS. 4 to 6. The water-cooled combustion chamber 1 arranged above the housing 3 in the upper part 3' thereof, in plan view, approximately corresponds to the flat-rectangular cross-section of the housing 3 below the combustion chamber 1, with the burner insert opening 5 being provided within or approximately within a plane E extending through a front wall GS having a corresponding width to, and extending parallel with, the rear wall WS.

Figure 7:
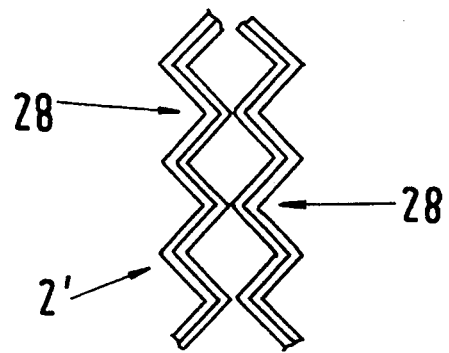
FIG. 7 shows a partial section through a two-layered wall of the pockets forming the heating gas tubings.
Figure 8:
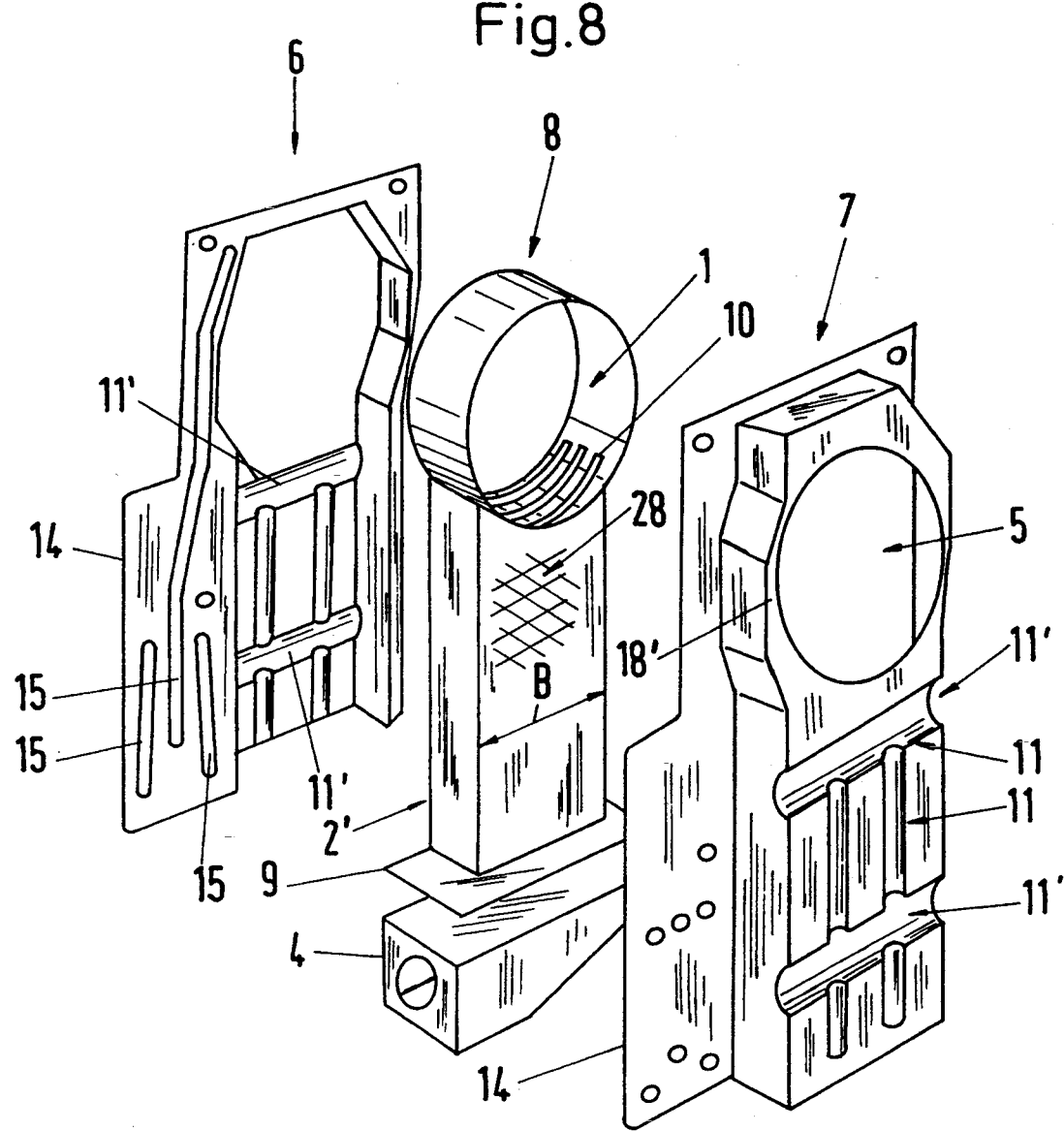
FIG. 8 shows an elevational view of the main parts (cups) of the housing.

Moreover, it is also common to the two embodiments shown in FIGS. 1 to 3 and FIGS. 4 to 6 that the water-carrying housing 3, inclusive of the combustion chamber 1, is formed of four components, to wit, the rear wall cup 6, the front wall cup 7, the inner pot-shaped combustion chamber cup 8 which is inserted into an opening 9' of the front wall cup 7 and which is provided with connecting apertures 10 for the pockets 2' incorporated at the bottom end thereof, and the bottom cup 9, to which is mounted the exhaust gas collecting chamber 4. The rear and front wall cups 6, 7 can be made of steel plate while the other walls confining gas-carrying spaces may be made of condensate-resistant material such as stainless steel (for condensate operation) or of double-layer material (for low-level temperature operation) (see FIG. 7). The rear wall and front wall cups 6, 7 are interconnected in a liquid-tight manner along a vertical central plane $E_1$ of the housing 3, i.e. the two rear wall and front wall cups 6, 7 are approximately of identical depth T, as shown in FIG. 3 and FIG. 8.

In the embodiment shown in FIGS. 1 to 3, the rear wall and the front wall cups 6, 7, in the area of the pockets 2', are provided with reinforcing embossings 11, with wall supporting elements 12 being provided in the horizontally extending reinforcing embossings 11'. The design of the casing 3 made of two cups 6, 7 allows the rear wall and the front wall cups 6, 7 to be provided with lug extensions 14 located in a central plane $E_1$ in liquid-tight abutment, and to arrange therein embossings 16 having forward flow connection apertures 17 and enclosing conduit and housing cavities 15, as shown in FIGS. 1,3 so that, for example, heating or process water pumps or heat circulating pumps, valves and similar heater accessories can be connected directly to the heater.

The blower burner 18, inserted into the burner insert opening 5 and therefore not involving any external space requirements due to the shape of the inner combustion chamber cup 8, is a metal cloth surface burner of a semi-global or semi-ellipsoidal configuration or of a shape approximately corresponding to such a configuration. The blower burner 18 is mounted in a gas-tight manner to a flange 18' of the burner insert opening 5 so that the blower can take in the required air directly from the assembly space or from the atmosphere, meaning that an additional air box of the kind as commonly used with water heaters of this type can be eliminated.

To enable the extremely flat gas hot water heater of the present invention to be fixed to a wall as shown in FIGS. 2 and 5, wall fasteners 20 in the form of suspended tongues 20' are provided which may be integral parts of the wall supporting elements 12.

The blower 25 (dash-dotted in FIG. 2) for the burner 18 may be, but is not required to be disposed in front of the burner 18 and, hence, before the plane E. To comply with the flat design requirements, it is also possible to provide the blower 25 laterally next to the combustion chamber area and to supply the gas/air mixture through a feed-line 24 which protrudes only slightly from the housing, as shown in broken lines in FIG. 2.

The entire housing 3, inclusive of the water-carrying upper portion for the combustion chamber 1, is usually surrounded by heat insulation 26 and an external casing 27 as shown in FIG. 2.

Without requiring a change in the heater design and, hence, in the automated manufacturing aids, pockets 2' of varying wall strucutre can be welded for the heating gas tubings 2, depending on the desired mode of operation (condensate operation/low-level temperature operation) while maintaining the pocket sizes. FIGS. 1 through 6 show three and two pockets, respectively, of stainless steel plate, the walls of which are provided with crossed corrugated embossings 28 to enlarge the heat exchange surface. The width B of the pockets 2' corresponds approximately to the diameter of the combustion chamber 1, as shown in FIGS. 1,6 and 8.

Considering the fully automated manufacture as well as the wall installation, the water-carrying connections 22 are provided on the front side of the heater.

The exhaust gas collecting chamber 4 formed of condensate-resistant material is suitably mounted as a pre-manufactured box—as shown in FIGS. 1 and 2—on the housing 3 and includes a condensate connection 23' for the condensate operation. The exhaust gas connection 23 extends laterally and upwardly from the exhaust gas collecting chamber 4 (see FIGS. 1, 3).

While a full and complete description of the preferred embodiments of the invention has been set forth in accordance with the dictates of the Patent Statutes, it should be understood that modifications can be made thereto without departing from the spirit of the invention or the scope of the appended claims.

What we claim is:

1. A gas hot water heater comprising a housing having walls, connections for forward and return flow of water, a cup-shaped combustion chamber located in an interior of the housing, and a heating gas tubing provided in the interior of the housing, which heating gas tubing connects the combustion chamber with an exhaust gas collecting chamber on which are provided an exhaust gas connection and a condensate discharge connection, with the housing formed as a flat-rectangular configuration, with the heating gas tubing formed as a pocket and arranged parallel to a rear wall of the housing and substantially corresponding to a width thereof, with the cup-shaped combustion chamber provided in an upper portion of the housing and substantially corresponding in width and depth to a flat-rectangular cross-section of the housing below the combustion chamber, and with a burner insert opening in the combustion chamber for connection of a gas blower burner located on a plane extending through a front wall of the housing.

2. The gas hot water heater according to claim 1, wherein the blower burner inserted into the burner insert opening is a metal cloth surface burner of semi-global configuration.

3. The gas hot water heater according to claim 1, wherein the housing, inclusive of the combustion chamber, includes a rear wall cup, a front wall cup and an inner pot-shaped combustion chamber cup inserted into an opening of the front wall cup and provided with connecting openings for the pockets which, at the bottom end, are incorporated into a bottom cup to which is mounted the exhaust gas collecting chamber.

4. The gas hot water heater according to claim 3, wherein the rear wall cup and the front wall cup are interconnected, in a liquid-tight manner, along a vertical central plane of the housing.

5. The gas hot water heater according to claim 3, wherein the rear wall cup and the front wall cup, in an area of the pockets, are each provided with reinforcing embossings.

6. The gas hot water heater according to claim 5, wherein wall supporting elements are provided in a horizontally extending reinforcing embossing.

7. The gas hot water heater according to claim 3, wherein the rear wall cup and front wall cup are each provided with lug extensions disposed in liquid-tight abutment in a central plane, with embossings having connection openings for forward flow and enclosing conduit and housing cavities arranged therein.

8. The gas hot water heater according to claim 2, wherein the burner is connected in gas-tight manner to the burner insert opening.

9. The gas hot water heater according to claim 3, further including wall mounting elements in the form of suspended tongues and located on the rear wall cup.

10. The gas hot water heater according to claim 1, wherein the pocket is formed of a condensate-resistant material.

11. The gas hot water heater according to claim 1, wherein walls of the pocket are of a double-layer formation.

12. The gas hot water heater according to claim 1, wherein the housing walls externally confining the interior of the housing are formed of steel plate.

13. The gas hot water heater according to claim 1, wherein the connections for forward and return flow of water are provided on a front side of the hot water heater.

14. The gas hot water heater of claim 2, wherein the metal cloth surface burner is of a semi-ellipsoidal configuration.

* * * * *